United States Patent
Glugla et al.

(10) Patent No.: US 9,599,048 B2
(45) Date of Patent: *Mar. 21, 2017

(54) METHODS AND SYSTEMS FOR CYLINDER BANK MISFIRE DETECTION AND REACTIVATION

(71) Applicant: Ford Global Technologies, LLC, Dearborn, MI (US)

(72) Inventors: Chris Paul Glugla, Macomb, MI (US); Robert Sarow Baskins, Grass Lake, MI (US); Joseph Patrick Whitehead, Belleville, MI (US); Craig Alan Smith, Lake Orion, MI (US); Timothy Robert Gernant, Ann Arbor, MI (US); Scott Richard Hughes, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,640

(22) Filed: Jan. 25, 2016

(65) Prior Publication Data
US 2016/0138500 A1    May 19, 2016

Related U.S. Application Data

(63) Continuation of application No. 13/907,401, filed on May 31, 2013, now Pat. No. 9,243,573.

(51) Int. Cl.
*F02D 17/02* (2006.01)
*F02D 41/00* (2006.01)
(Continued)

(52) U.S. Cl.
CPC .......... *F02D 41/0087* (2013.01); *F01N 3/20* (2013.01); *F01N 11/002* (2013.01); *F02D 17/02* (2013.01); *F02D 35/0015* (2013.01); *F02D 35/028* (2013.01); *F02D 41/0082* (2013.01); *F02D 41/2406* (2013.01); *F02D 2041/227* (2013.01); *F02D 2041/228* (2013.01); *F02D 2200/0802* (2013.01); *F02D 2200/1015* (2013.01); *Y02T 10/40* (2013.01)

(58) Field of Classification Search
CPC ..... F02D 35/028; F02D 17/02; F02D 41/0087
See application file for complete search history.

(56) References Cited

U.S. PATENT DOCUMENTS

| | | |
|---|---|---|
| 6,619,267 B1 | 9/2003 | Pao |
| 2005/0033501 A1 | 2/2005 | Liu et al. |

(Continued)

FOREIGN PATENT DOCUMENTS

EP    0709664 A1    5/1996

*Primary Examiner* — Lindsay Low
*Assistant Examiner* — Kevin Lathers
(74) *Attorney, Agent, or Firm* — Julia Voutyras; John D. Russell; B. Anna McCoy

(57) ABSTRACT

Various systems and methods are described for deactivation and reactivation of a cylinder bank in a V-engine. In one example, the cylinder bank is deactivated responsive to an indication of misfire based on crankshaft acceleration and exhaust air fuel ratio. The cylinder bank is reactivated sequentially based on exhaust catalyst temperature.

18 Claims, 5 Drawing Sheets

(51) Int. Cl.
*F02D 35/02* (2006.01)
*F01N 3/20* (2006.01)
*F01N 11/00* (2006.01)
*F02D 35/00* (2006.01)
*F02D 41/24* (2006.01)
*F02D 41/22* (2006.01)

(56) References Cited

U.S. PATENT DOCUMENTS

| | | |
|---|---|---|
| 2005/0193986 A1* | 9/2005 | Cullen ............... F02D 41/0082 123/478 |
| 2006/0054132 A1* | 3/2006 | Uchiyama ........... F02D 41/1498 123/299 |
| 2007/0234982 A1 | 10/2007 | Kolmanovsky et al. |
| 2008/0249699 A1 | 10/2008 | Wolber et al. |
| 2010/0043746 A1 | 2/2010 | Hartmann et al. |
| 2011/0072893 A1 | 3/2011 | Malaczynski |
| 2013/0312504 A1 | 11/2013 | Bowman et al. |

\* cited by examiner

METHODS AND SYSTEMS FOR CYLINDER BANK MISFIRE DETECTION AND REACTIVATION

CROSS REFERENCE TO RELATED APPLICATIONS

The present application is a continuation of U.S. patent application Ser. No. 13/907,401, entitled "METHODS AND SYSTEMS FOR CYLINDER BANK MISFIRE DETECTION AND REACTIVATION," filed May 31, 2013, the entire contents of which are hereby incorporated by reference for all purposes.

TECHNICAL FIELD

The present application relates generally to detection of cylinder bank misfire in a V-engine and reactivation of the cylinder bank.

BACKGROUND AND SUMMARY

On V-engines, which have two cylinder banks, every cylinder in one of the banks may misfire, which may be referred to as cylinder bank misfire. Additionally, individual cylinders of the engine may misfire.

Responsive to misfire, the misfiring cylinders may be deactivated until the engine is serviced. For example, if an individual cylinder repeatedly misfires, it may be deactivated by discontinuing fuel injection until the engine is serviced. As another example, if a bank of cylinders experiences misfire, all cylinders in the bank may be deactivated in a similar way, again until the engine is serviced.

However, the inventors herein have recognized a disadvantage with the above approach. Namely, cylinder bank misfire may be due to significantly different causes than individual cylinder misfire. Particularly, cylinder bank misfire may not be persistent misfire and may be due to a temporary cause, such as charge air cooler condensate ingestion by the engine, whereas individual cylinder misfire may be due to degraded wiring, a degraded spark plug for that cylinder, etc.

The inventors herein have recognized problems described above and have devised an approach to at least partially address them. Thus, in one example, a method for deactivating and reactivating a cylinder bank in a V-engine is disclosed. The method comprises, responsive to cylinder bank misfire detection, reactivating cylinders sequentially based on misfire detection upon reactivation of a cylinder.

For example, each cylinder within a cylinder bank may be deactivated responsive to misfire occurring in a number of different cylinders, for example all the cylinders, of the bank. Then, during continued engine operation while remaining cylinders continue to combust, the deactivated cylinders are sequentially reactivated, for example one at a time. Upon activation of each cylinder, individual cylinder misfire is monitored for that reactivated cylinder. If no misfire is detected, the next cylinder in the bank may be activated, and again monitored for misfire.

In this way, it can be advantageous to reactivate the cylinders in order to reduce degraded vehicle performance and return to all cylinders firing operation.

In such an approach, cylinder bank misfire detection may be based on crankshaft acceleration and exhaust air fuel ratio, for example. As noted above, the cylinder bank may be deactivated responsive to the detection of misfire and then sequentially reactivated. By sequentially reactivating the cylinders, the cylinder bank may be reactivated over time such that degradation of the system is reduced while a duration in which engine and/or vehicle performance may be degraded is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

For example, while in one example distinctions are made between cylinder bank misfire and individual cylinder misfire, the approaches described herein may be applied to respond to misfire differently depending on the number of cylinders experiencing misfire. For example, distinctions may be made between misfire in a group of identified cylinders, and misfire in an individual cylinder within the group. For example, another embodiment may include a method for deactivating and reactivating a cylinder group of a plurality of cylinders in an engine. The method may include, responsive to misfire in a plurality of cylinders in the group, deactivating the cylinder group (while continuing combustion in remaining engine cylinders). Further, the method may include reactivating deactivated cylinders sequentially based on whether or not individual cylinder misfire is identified upon reactivation of each cylinder in the group until all cylinders are reactivated. If upon reactivation individual cylinder misfire is detected, then that cylinder may be deactivated with remaining cylinders in the group being reactivated. Further, the method may include monitoring individual cylinder misfire during engine operation and deactivated only if the identified cylinder with individual cylinder misfires.

DETAILED DESCRIPTION

The following description relates to methods and systems for deactivation and reactivation of a cylinder bank in a V-engine. In one example, a method includes, responsive to cylinder bank misfire detection, deactivating each cylinder of the cylinder bank, and then reactivating the cylinders sequentially. Cylinder bank misfire may be identified based on crankshaft acceleration and exhaust air fuel ratio. For example, slow accelerations in specific crank intervals and a leaner than desired exhaust air fuel ratio may indicate cylinder bank misfire. Once an exhaust catalyst temperature is less than a threshold temperature, the cylinders may be reactivated sequentially. For example, one cylinder or a subset of cylinders may be reactivated at one time. In this manner, the cylinder bank may be deactivated such that degradation of system components, such as the exhaust catalyst, is reduced. Further, the cylinders may be reactivated during engine operation in such a way that degradation of engine and/or vehicle performance is reduced.

Figure 1:
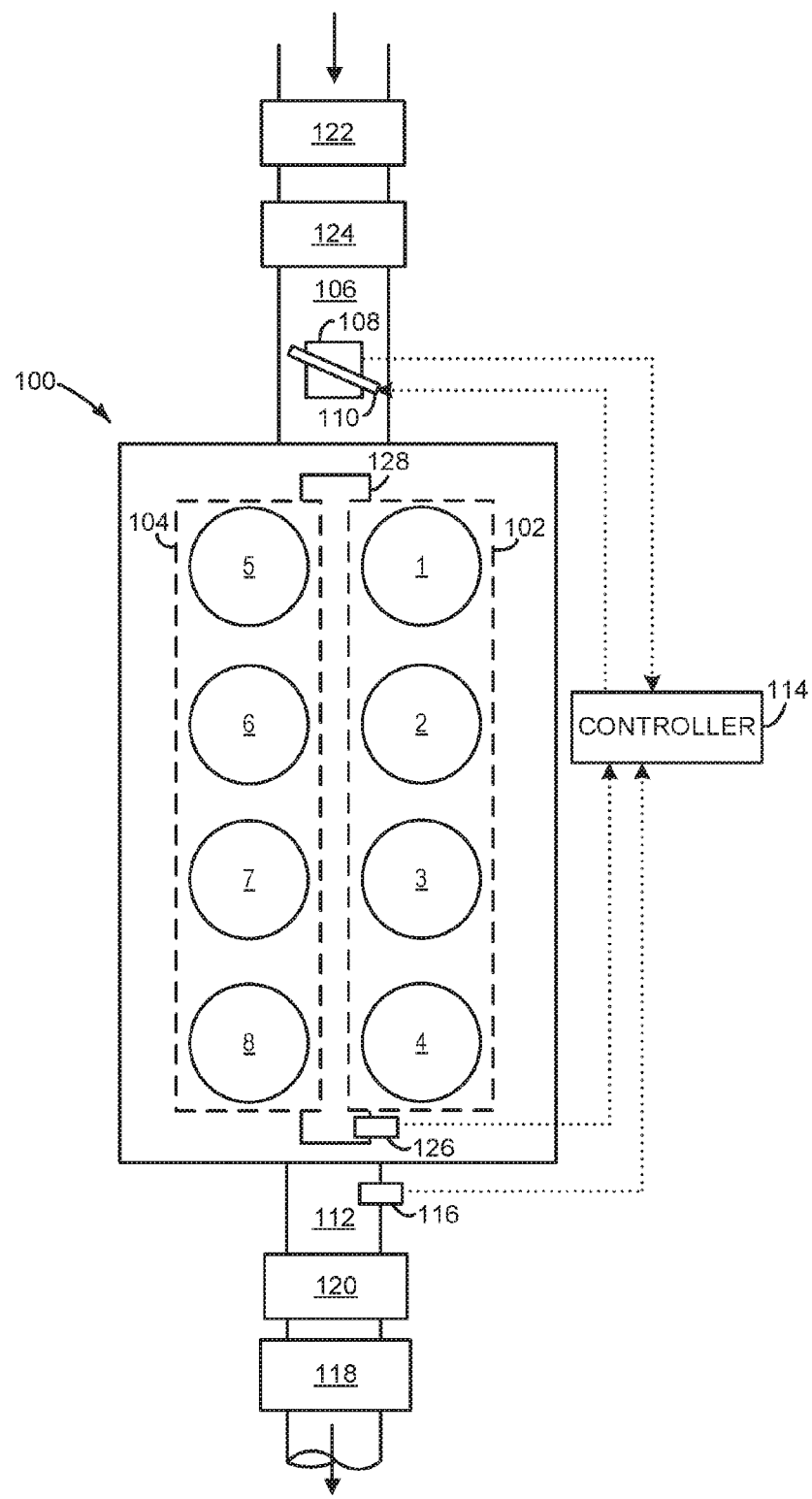
FIG. 1 shows a schematic diagram of a V-engine including two cylinder banks.

Referring now to FIG. 1, a schematic diagram showing a multi-cylinder engine 100, which may be included in a propulsion system of an automobile, is illustrated. The engine 100 may be controlled at least partially by a control system including a controller 114.

The engine 100 may be a V-engine, and in this non-limiting example, a V-8 engine is illustrated with a first cylinder bank 102 (e.g., the right cylinder bank in FIG. 1) including four cylinders and a second cylinder bank 104 (e.g., the left cylinder bank in FIG. 1) including four cylinders. In other examples, the engine may have another number of cylinders, such as a V-6 engine, V-10 engine, or V-12 engine, for example. In the example of FIG. 1, the first cylinder bank 102 includes a first cylinder, a second cylinder, a third cylinder, and a fourth cylinder. The second cylinder bank 104 includes a fifth cylinder, a sixth cylinder, a seventh cylinder, and an eighth cylinder. The cylinders of the first cylinder bank 102 and the second cylinder bank 104 may receive intake air from an intake passage 106 and may exhaust combustion gases via an exhaust passage 112.

In one example, the engine 100 is a diesel engine that combusts air and diesel fuel through compression ignition. In other non-limiting embodiments, the engine 100 may combust a different fuel including gasoline, biodiesel, or an alcohol containing fuel blend (e.g., gasoline and ethanol or gasoline and methanol) through compression ignition and/or spark ignition.

The intake passage 106 may include a throttle 108 having a throttle plate 110. In this particular example, the position of the throttle plate 110 may be varied by the controller 112 via a signal provided to an electric motor or actuator included with the throttle 108, a configuration that is commonly referred to as electronic throttle control (ETC). In this manner, the throttle 108 may be operated to vary the intake air provided to the engine cylinders.

As depicted, an exhaust gas sensor 116 is coupled to the exhaust passage 112 upstream of an emission control device 118. The sensor 116 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The emission control device 118 is shown arranged along the exhaust passage 112 downstream of the exhaust gas sensor 116. In the example shown in FIG. 1, the emission control device 118 may be an exhaust catalyst, such as a three way catalyst, for example. In other embodiments, the device 118 may additionally or alternatively include a particulate filter, $NO_x$ trap, selective catalytic reduction system, various other emission control devices, or combinations thereof. In some embodiments, during operation of the engine 100, the emission control device 118 may be periodically reset by operating at least one cylinder of the engine within a particular air/fuel ratio.

When misfire of one or more cylinders of the engine 100 occurs, such as when cylinder bank misfire occurs, the exhaust air fuel ratio may increase (e.g., become more lean) due to uncombusted oxygen entering the exhaust passage 112. Further, uncombusted fuel entering the exhaust passage 112 due to misfire may be combusted in the vicinity of the emission control device 118, thereby increasing a temperature of the emission control device 118 leading to degradation of the emission control device 118.

As depicted in FIG. 1, the engine 100 is configured with a turbocharger including a turbine 120 arranged along the exhaust passage 114 and a compressor 122 arranged in the intake passage 106. The compressor 122 may be at least partially powered by the turbine 120 via a shaft (not shown). The turbocharger increases air charge of ambient air drawn into the intake passage 106 in order to provide greater charge density during combustion to increase power output and/or engine-operating efficiency. While in this case a single turbocharger is included, the system may include multiple turbine and/or compressor stages.

Further, as shown in FIG. 1, a charge air cooler (CAC) 124 is arranged along the intake passage 106 upstream of the throttle 62 for cooling intake air after it has passed through the turbine 120 and the compressor 122 of the turbocharger. Condensate that is formed in the CAC 124 may be carried out of the CAC 124 by intake air passing through the CAC 124, and may be ingested by cylinders of the engine 100. In some cases, the condensate ingested by the engine may result in cylinder bank misfire, for example. As described in greater detail herein, such misfire may be detected by monitoring crankshaft acceleration as well as exhaust gas air fuel ratio. Responsive to such misfire, a cylinder bank may be deactivated and subsequently sequentially reactivated under certain conditions in order to reduce degraded vehicle performance resulting from cylinders deactivated for an extended period. Thus, the engine system further includes a crankshaft position sensor 126, or Hall effect sensor, configured to monitor the position and/or rotational speed of the crankshaft 128.

The controller 114 shown in FIG. 1 may be a microcomputer which may include a microprocessor unit, input/output ports, an electronic storage medium for executable programs and calibration values, random access memory, keep alive memory, and a data bus, for example. The storage medium read-only memory can be programmed with non-transitory, computer readable data representing instructions executable by the processor for performing the methods described below as well as other variants that are anticipated but not specifically listed. The controller 114 may receive various signals from sensors coupled to the engine 100, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor 126 (or other type) coupled to the crankshaft 128; throttle position (TP) from a throttle position sensor; and absolute manifold pressure signal, MAP. An engine speed signal, RPM, may be generated by controller 114 from signal the PIP, for example.

In one example, the controller 114 may determine cylinder bank misfire based on crankshaft acceleration from the crankshaft sensor 126 and exhaust air fuel ratio from the exhaust gas sensor 116. Once misfire is determined, the controller may cut-off fuel injection to the cylinder bank in which misfire is occurring, for example, such that the cylinder bank is deactivated and combustion does not occur in the cylinders of the deactivated cylinder bank. Based on output from a temperature sensor coupled to the exhaust catalyst 118, for example, the controller 114 may determine that the cylinder bank may be reactivated. The controller 114 may control reactivation of the cylinder bank by sequentially re-starting fuel injection in one or more cylinders.

In the example of FIG. 1, the engine 100 is a variable displacement engine, in which a number of cylinders may be deactivated. Deactivation may include disabling fuel injection to the cylinder and/or holding the cylinder intake and exhaust valves closed, and trapping exhaust gas in the combustion chamber, during one or more engine cycles. Furthermore, cylinder deactivation may include deactivating the cylinder valves (e.g., intake valve and exhaust valve) via hydraulically actuated lifters coupled to valve pushrods, or via a cam profile switching mechanism in which a cam lobe with no lift is used for deactivated valves. In this way, the cylinders are deactivatable. Still other cylinder deactivation mechanisms may also be used, such as electrically actuated valves, disabled fuel injection with normal valve operation, etc.

The engine 100 of FIG. 1 may further include a low-pressure exhaust gas recirculation (EGR) system for routing exhaust gas from downstream of the turbine to upstream of the compressor. Such operation may exacerbate condensate formation under selected conditions. The methods of operating the engine may include flowing low-pressure EGR during engine operation.

Figure 2:
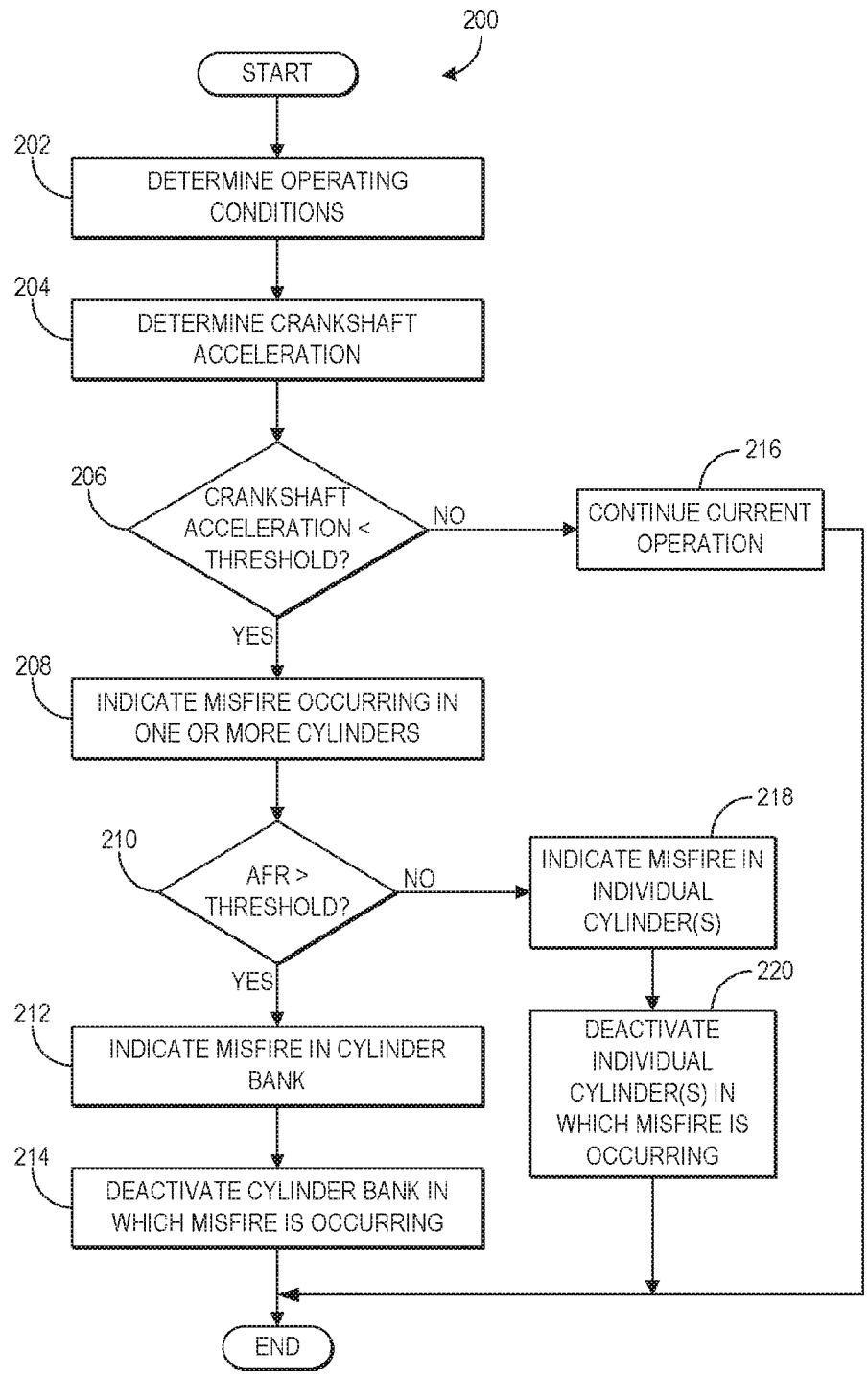
FIG. 2 shows a flow chart illustrating a routine for deactivating a cylinder bank responsive to cylinder bank misfire.
Figure 3:
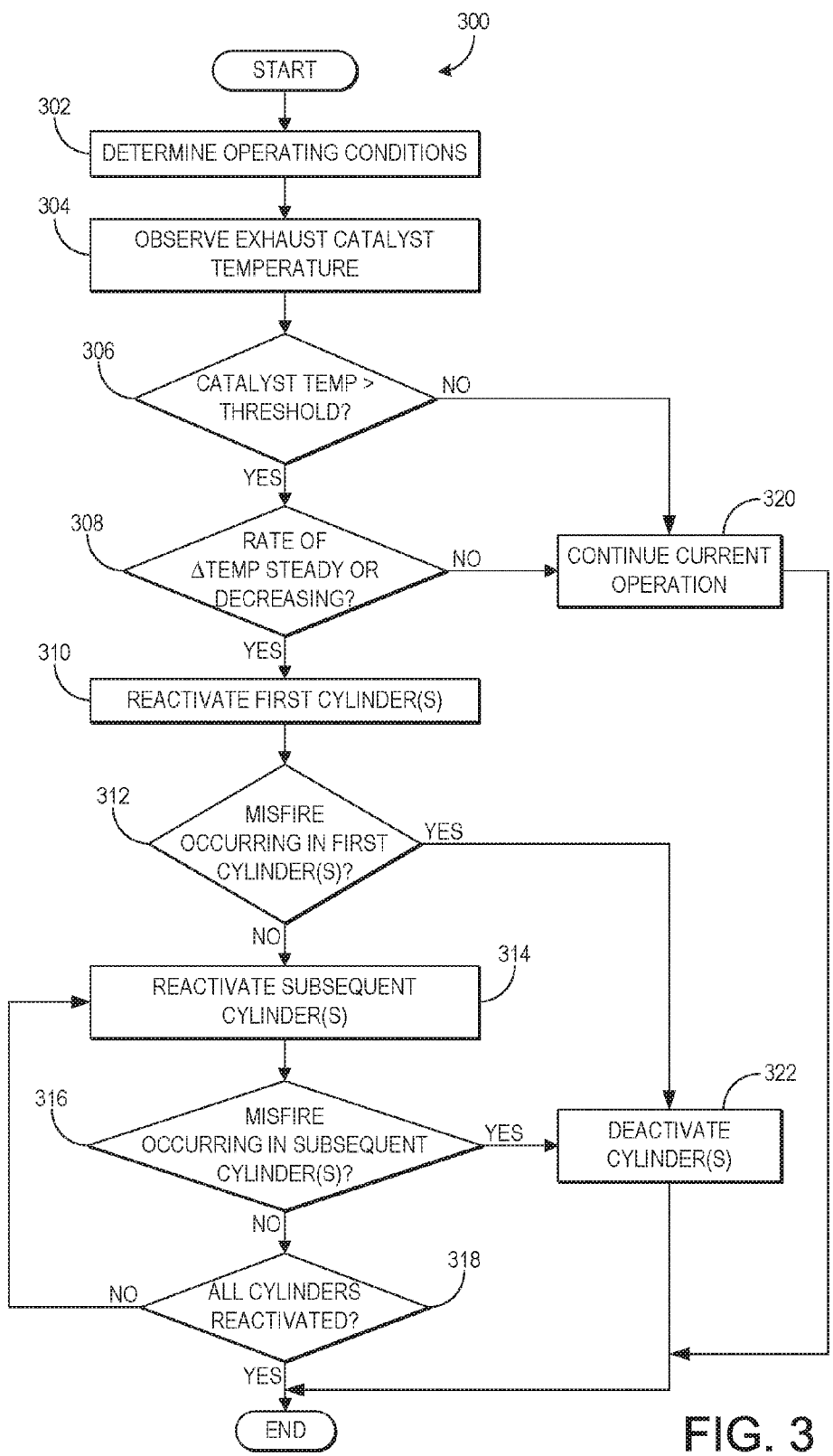
FIG. 3 shows a flow chart illustrating a routine for sequentially reactivating a cylinder bank.

FIGS. 2 and 3 show flow chart illustrating routines for an engine system, such as the engine system described above with reference to FIG. 1. In particular, FIG. 2 shows a flow chart illustrating a routine for deactivating a cylinder bank based on crankshaft acceleration and exhaust air fuel ratio, and FIG. 3 shows a routine for reactivating the cylinder bank sequentially based on exhaust catalyst temperature. Misfire of a cylinder bank may occur due to ingestion of condensate from a charge air cooler, for example. Such misfire may be a transient condition, however, and as such, it may be desirable to reactivate the cylinder bank after deactivation such that vehicle performance is not degraded (e.g., noise, vibration, and harshness) due to the deactivated cylinder bank.

Continuing to FIG. 2, a flow chart illustrating a control routine 200 for identifying misfire in a cylinder bank of an engine, such as a V-engine, and deactivating the cylinder bank responsive to the identification of misfire is shown. Specifically, the routine determines crankshaft acceleration and exhaust air fuel ratio, and deactivates a cylinder bank under certain conditions. For example, the cylinder bank is deactivated when the crankshaft acceleration is less than a threshold and the exhaust air fuel ratio is greater than a threshold air fuel ratio.

At 202, engine operating conditions are determined. As non-limiting examples, the engine operating conditions may include engine speed, air fuel ratio, number of activated cylinders, etc.

At 204, the crankshaft acceleration is determined. The crankshaft acceleration may be determined based on output from a crankshaft sensor, such as the crankshaft sensor 126 shown in FIG. 1, for example.

Once the crankshaft acceleration is determined, the routine proceeds to 206 where it is determined if the crankshaft acceleration is less than a threshold acceleration. For example, the crankshaft acceleration may be compared to expected values of normally operating cylinders. If accelerations are slow in specific crank intervals aligned with the firing period of a particular cylinder, then a misfire may be flagged. Thus, at 208, it is indicated that misfire is occurring in one or more cylinders. If it is determined that crankshaft acceleration is not less than a threshold, however, the routine moves to 216 and current operation is continued.

At 210 of the routine 200, it is determined if the exhaust air fuel ratio is greater than a threshold air fuel ratio. As an example, when cylinder bank misfire occurs, the exhaust air fuel ratio may become leaner due to uncombusted oxygen in the exhaust gas stream. Thus, the threshold air fuel ratio may be a desired air fuel ratio or an expected air fuel ratio based on the current operating conditions, for example.

If it is determined that the air fuel ratio is less than the threshold air fuel ratio, the routine moves to 218 where individual cylinder misfire is indicated in one or more cylinders. For example, a flag or diagnostic code indicating individual cylinder misfire may be set and an indicator light on a dashboard of the vehicle in which the engine is positioned may be illuminated. The individual cylinder misfire flag or code may remain set until the vehicle in which the engine is positioned is serviced, for example.

Once individual misfire in one or more cylinders is indicated, the routine continues to 220 where the individual cylinder or cylinders in which misfire is occurring are deactivated. As examples, fuel injection to the cylinder(s) may be cut-off or the cylinder valves (e.g., intake and exhaust valves) may be deactivated. Further, spark may be deactivated to the cylinders. When individual cylinders are deactivated according to the routine described above, the individual cylinders may not be reactivated during engine operation and may remain deactivated until the engine is serviced and the flag or diagnostic code is cleared.

On the other hand, if it is determined that the exhaust air fuel ratio is greater than the threshold air fuel ratio, the routine continues to 212 where cylinder bank misfire is indicated. Cylinder bank misfire may be indicated by setting a flag or diagnostic code for cylinder bank misfire and illuminating a dashboard indicator light, for example. The diagnostic code or flag for cylinder bank misfire may be different from the diagnostic code or flag set for individual cylinder misfire in that the diagnostic code or flag for cylinder bank misfire may be cleared during engine operation and the cylinder bank may be reactivated (FIG. 3), as the cause for misfire may be due to a transient condition such as ingestion of charge air cooler condensate by the engine. In contrast, as described above, the diagnostic code or flag for individual cylinder misfire may not be cleared until the vehicle is taken in for service to repair the problem causing misfire.

At 214 of the routine 200, the cylinder bank in which misfire is occurring is deactivated. In some examples, cylinder bank misfire may occur in the first cylinder bank, while in other examples, cylinder bank misfire may occur in the second cylinder bank. As examples, fuel injection to the cylinder(s) may be cut-off or the cylinder valves (e.g., intake and exhaust valves) may be deactivated.

Thus, cylinder bank misfire may be indicated when crankshaft acceleration is less than a threshold acceleration and exhaust air fuel ratio is greater than a threshold air fuel ratio. Responsive to the indication, the cylinder bank may be deactivated via an action such as fuel cut-off in every cylinder of the cylinder bank such that every cylinder of the cylinder bank is disabled.

FIG. 3 shows a flow chart illustrating a control routine 300 for reactivating a cylinder bank after it has been deactivated. Specifically, the routine determines a temperature of an exhaust catalyst, such as the catalyst 118 shown in FIG. 1, and determines if the rate of change of the temperature of the catalyst is steady or decreasing. When the catalyst temperature is less than a threshold temperature and a rate of change of the temperature is steady or decreasing, cylinders of the cylinder bank are reactivated sequentially, as described below. Steady operation may include the relevant parameter being within 5% of its value for a selected duration, such as a period of time.

At 302, engine operating conditions are determined. The engine operating conditions may include, but are not limited to engine speed, air fuel ratio, number of activated cylinders, etc.

At 304, the exhaust catalyst temperature is observed. For example, the catalyst temperature may be observed over a period of time, such as since the cylinder bank was deactivated or after a particular duration since the cylinder bank was deactivated. The exhaust catalyst temperature may be observed not only for the instantaneous temperature, but also for rate of temperature change. Thus, at 306, it is determined if the catalyst temperature is less than a threshold temperature. The threshold temperature may be less than a temperature at which catalyst degradation may occur, for example. If it is determined that the catalyst temperature is greater than the threshold temperature, the routine 300 moves to 320 and current operation is continued (e.g., the cylinder bank remains deactivated).

On the other hand, if it is determined that the catalyst temperature is less than the threshold temperature, the routine 300 continues to 308 where it is determined if the rate of change of the catalyst temperature is steady or decreasing, and not increasing. If the rate of change of catalyst temperature is not steady or decreasing, the routine moves to 320 and current operation is continued (e.g., the cylinder bank remains deactivated).

Instead, if it is determined that the rate of change of catalyst temperature is steady or decreasing, the routine proceeds to 310 and the first cylinder or subset of cylinders is reactivated. The cylinders may be reactivated in a particular order in order to minimize degradation of vehicle or engine performance during reactivation, such as in order to reduce noise, vibration, and harshness. As one example, if the first bank of cylinders is deactivated, the first and fourth cylinders (see FIG. 1) may be reactivated first and the second and third cylinders may be reactivated second. As another example, the third cylinder may be reactivated first, followed by the fourth cylinder, than the first cylinder, and, finally, the second cylinder. In one example, the order of reactivation may be based on the engine firing order to minimize vibration during the sequential reactivation. In another example, a torque converter coupled to the engine may be unlocked to reduce torsional vibration until all cylinders of the cylinders of the cylinder bank are reactivated and combusting.

In other examples, the order of sequential reactivation of the cylinder bank may be based on water distribution in the intake passage when cylinder bank deactivation is due to a cause such as engine ingestion of charge air cooler condensate. For example, initiation of the reactivation may be based on inferred water distribution empirically determined from intake manifold design that some cylinders may receive more water than others. In such an example, the cylinders that receive the least water are the first to be reactivated. Such distribution may be estimated in real time based on operating conditions, or may include a pre-stored table of water distribution, upon which the reactivation cylinder sequence is based during a first set of operating conditions. In this case, only a single cylinder may be reactivated during each engine cycle, until all cylinders are reactivated. However, during a second set of operating conditions, a different reactivation sequence may be selected based on, in order to maintain, engine firing order. During the second set of operating conditions, all deactivated cylinders may be reactivated in a single engine cycle, irrespective of water distribution. Such second operating conditions may include higher temperature and/or higher load conditions and/or lower humidity conditions and/or lower altitude conditions, as compared to the first set of operating conditions.

At 312, it is determined if misfire is occurring in the first cylinder or subset of cylinders (e.g., the cylinder(s) reactivated at 310). Misfire may be determined based on crankshaft acceleration, for example, as described above. If it is determined that misfire is occurring, the routine moves to 322 and the cylinder(s) are deactivated such that engine performance is not degraded. On the other hand, if it is determined that misfire is not occurring, the routine 300 continues to 314 and the subsequent cylinder or subset of cylinders is reactivated.

Once the subsequent cylinder(s) are reactivated, the routine proceeds to 316 where it is determined if misfire is occurring in the subsequent cylinder(s). Misfire may be determined based on crankshaft acceleration, for example, as described above. If it is determined that misfire is occurring, the routine moves to 322 and the cylinder(s) are deactivated such that engine performance is not degraded.

On the other hand, if it is determined that misfire is not occurring in the subsequent cylinders, the routine 300 continues to 318 where it is determined if all the cylinders of the cylinder bank have been reactivated. If it is determined that not all of the cylinders of the cylinder bank have been reactivated, the routine returns to 314 where a subsequent cylinder or subset of cylinders is reactivated. Instead, if it is determined that all cylinders of the cylinder bank have been reactivated, the routine ends.

In this way, based on exhaust catalyst temperature after cylinder bank deactivation, each cylinder of the cylinder bank is reactivated sequentially. As such, degradation of engine and/or vehicle performance may be minimized when a cylinder bank is deactivated responsive to misfire due to an issue such as ingestion of charge air cooler condensate by the engine.

Figure 4:
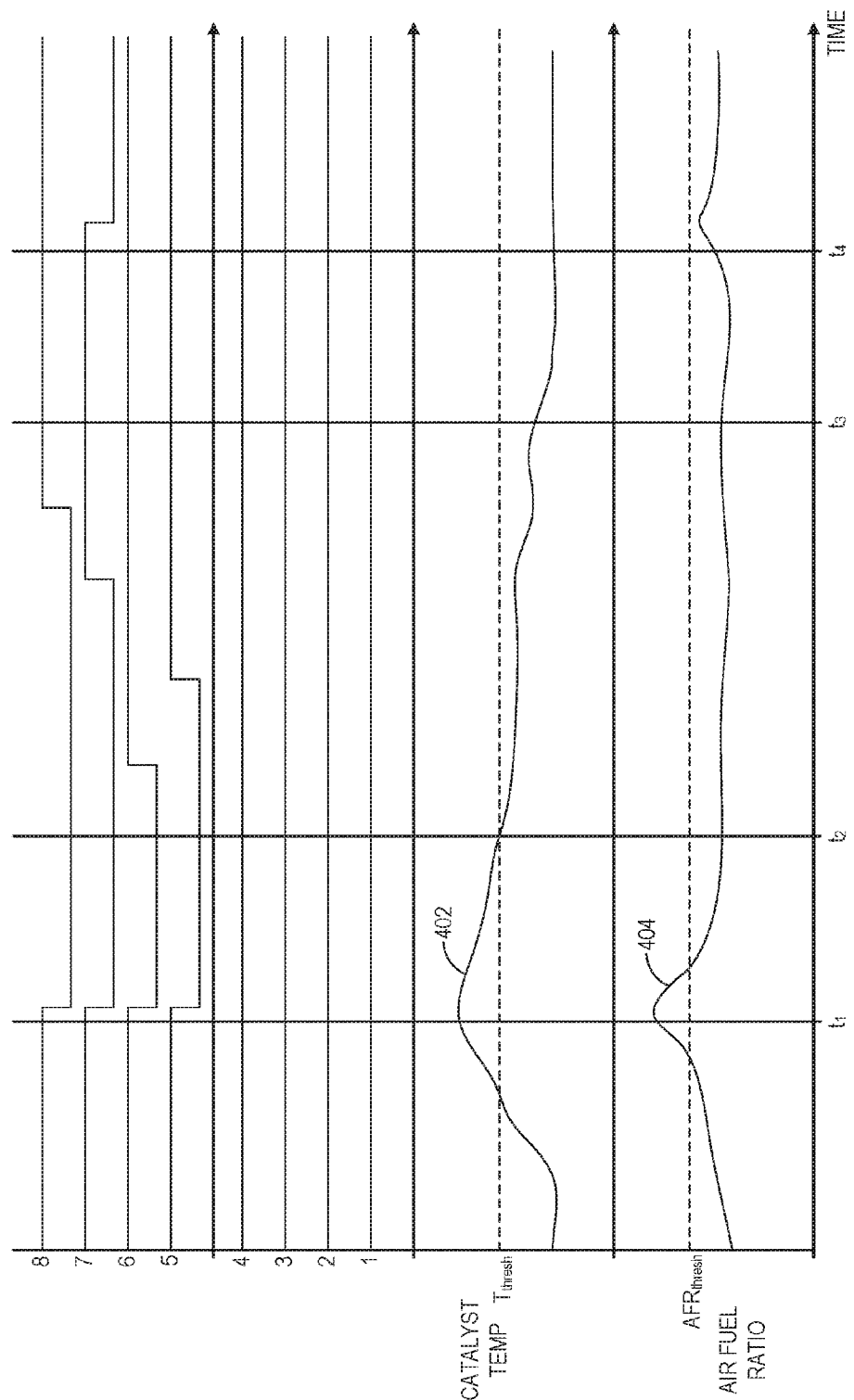
FIGS. 4 and 5 shows series of graphs illustrating examples of cylinder bank deactivation responsive to cylinder bank misfire and subsequent, sequential reactivation of the cylinder bank.
Figure 5:
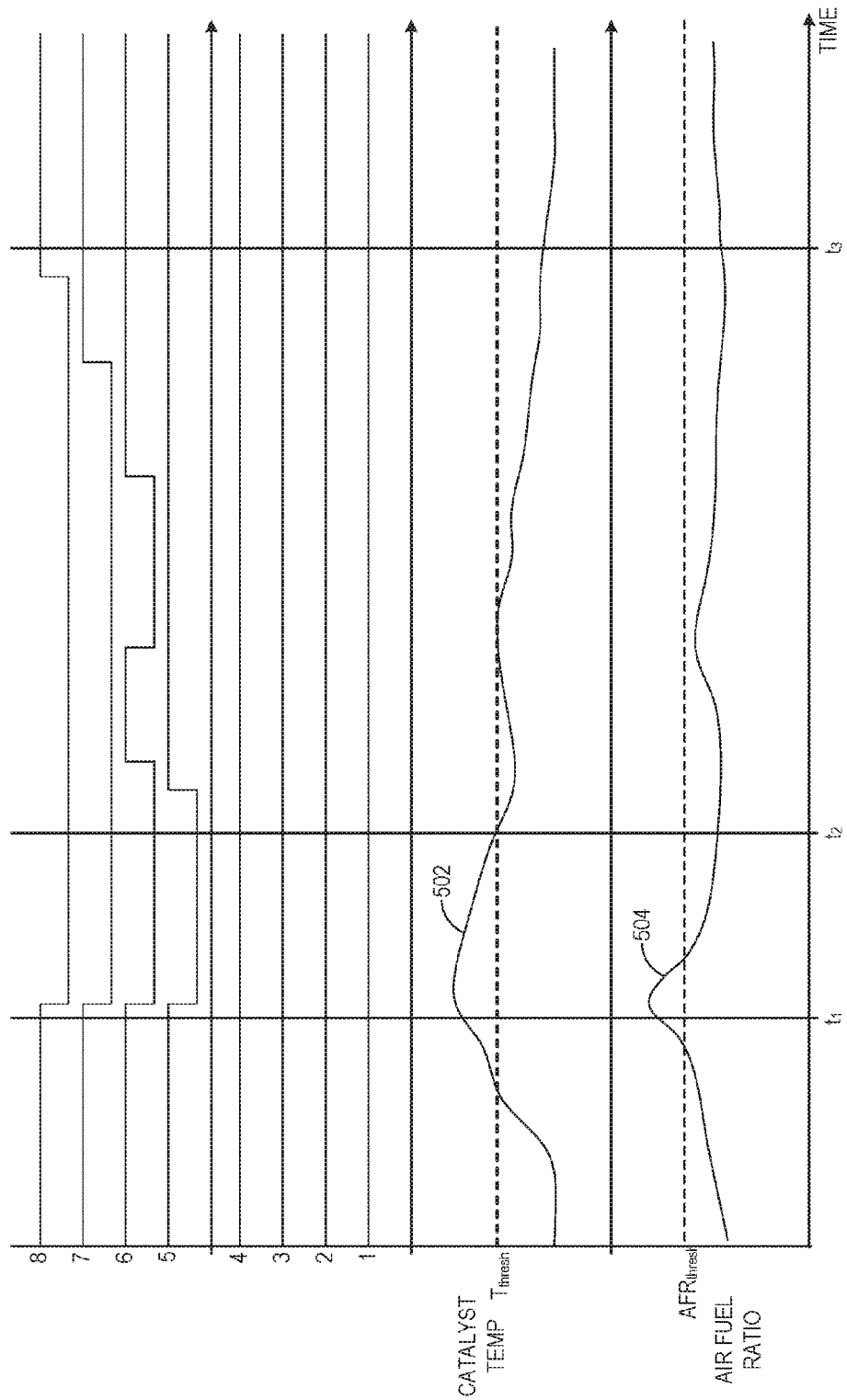

FIGS. 4 and 5 show series of graphs illustrating examples of cylinder deactivation and reactivation in a V-8 engine, such as the engine 100 described above with reference to FIG. 1. In the example of FIG. 4, the air fuel ratio 404 becomes leaner and exceeds a threshold air fuel ratio ($AFR_{thresh}$) just before a time $t_1$. Cylinder bank misfire is detected in the second cylinder bank at the time $t_1$, and each cylinder of the second cylinder bank (e.g., cylinders five, six, seven, and eight) is deactivated. At a time $t_2$, the catalyst temperature 402 drops below a threshold temperature ($T_{thresh}$) and it is determined that reactivation of the cylinders may begin. At a time $t_3$, the FMEM action for cylinder bank misfire may be cleared. At a time $t_4$, individual cylinder bank misfire is detected and a flag or diagnostic code indicating individual cylinder misfire is set. The individual cylinder (e.g., cylinder seven in the example of FIG. 4) is deactivated and may remain deactivated until the vehicle is serviced and or meets all governmental diagnostic requirements. Each cylinder of the first cylinder bank (e.g., cylinders one, two, three, and four) remains activated throughout the duration depicted in FIG. 4.

In the example of FIG. 5, the air fuel ratio 504 becomes leaner and exceeds a threshold air fuel ratio ($AFR_{thresh}$) just before a time $t_1$. Cylinder bank misfire is detected in the second cylinder bank at the time $t_1$, and each cylinder of the second cylinder bank (e.g., cylinders five, six, seven, and eight) is deactivated. At a time $t_2$, the catalyst temperature 502 drops below a threshold temperature ($T_{thresh}$) and it is determined that reactivation of the cylinders may begin. The fifth cylinder is reactivated followed by the sixth cylinder, but misfire is detected in the sixth cylinder and the cylinder is deactivated for a duration and then reactivated. Once the sixth cylinder is reactivated, the seventh and then eighth cylinders are reactivated. At a time $t_3$, the flag or diagnostic code indicating cylinder bank misfire may be cleared and an indicator light may be turned off. Each cylinder of the first cylinder bank (e.g., cylinders one, two, three, and four) remains activated throughout the duration depicted in FIG. 4.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A system, comprising:
an engine with first and second cylinder groups;
an exhaust system with an exhaust gas sensor positioned upstream of an exhaust catalyst; and
a control system including non-transitory instructions to indicate cylinder group misfire of one of the first and second cylinder groups based on crankshaft acceleration and the exhaust gas sensor, deactivate the cylinder group with cylinder group misfire identified responsive to an indication of bank misfire, and reactivate individual cylinders of the deactivated cylinder group sequentially based on temperature of the exhaust catalyst, the control system further comprising instructions for basing an order of the sequential reactivation on water distribution in an engine intake, the deactivation due to engine ingestion of condensate.

2. The system of claim 1, the control system further comprising instructions to deactivate an individual cylinder of the first or second cylinder group responsive to an indication of individual cylinder misfire and to not reactivate the individual cylinder until a diagnostic code indicating misfire in the individual cylinder is cleared.

3. The system of claim 2, wherein clearing the diagnostic code indicating misfire includes turning off an indicator light.

4. The system of claim 1, further comprising a compressor coupled to the engine intake and a charge air cooler coupled in the intake downstream of the compressor.

5. The system of claim 4, further comprising a turbine coupled to the compressor.

6. The system of claim 5, wherein initiation of the cylinder reactivation is based on an inferred water distribution determination including that some cylinders receive more water than others.

7. The system of claim 6, wherein cylinders that receive the least water are first to be reactivated in the sequential reactivation.

8. The system of claim 7, wherein the control system further includes instructions to estimate, in real time, the water distribution based on operating conditions, wherein the sequential reactivation is based upon the estimated water distribution during a first set of operating conditions.

9. The system of claim 8, wherein only a single cylinder is reactivated during each engine cycle, until all cylinders are reactivated.

10. The system of claim 9, wherein the control system further includes instructions for, during a second set of operating conditions, reactivating the deactivated cylinders according to a different sequential reactivation selected in order to maintain engine firing order.

11. The system of claim 10, wherein during the second set of operating conditions, all deactivated cylinders are reactivated in a single engine cycle, irrespective of water distribution.

12. The system of claim 11, wherein the second set of operating conditions includes higher temperature and/or higher load conditions and/or lower humidity conditions and/or lower altitude conditions, as compared to the first set of operating conditions.

13. The system of claim 11, wherein the second set of operating conditions includes higher temperature as compared to the first set of operating conditions.

14. The system of claim 11, wherein the second set of operating conditions includes lower humidity conditions, as compared to the first set of operating conditions.

15. The system of claim 11, wherein the second set of operating conditions includes lower altitude conditions, as compared to the first set of operating conditions.

16. The system of claim 1, wherein instructions to deactivate the cylinder group responsive to the exhaust gas sensor include deactivating the cylinder group when an air fuel ratio output by the exhaust gas sensor is greater than a threshold air fuel ratio, and wherein instructions to reactivate the individual cylinders sequentially based on the temperature of the exhaust catalyst includes reactivating the individual cylinders when the temperature is less than a threshold temperature and a rate of change of the temperature is steady.

17. A system, comprising:
an engine with first and second cylinder groups;
an exhaust system with an exhaust gas sensor positioned upstream of an exhaust catalyst; and
a control system including non-transitory instructions to indicate cylinder group misfire of one of the first and second cylinder groups based on crankshaft acceleration and the exhaust gas sensor, deactivate the cylinder group with cylinder group misfire identified responsive to an indication of bank misfire, and reactivate individual cylinders of the deactivated cylinder group sequentially based on temperature of the exhaust catalyst, wherein instructions to deactivate the cylinder group responsive to the exhaust gas sensor include deactivating the cylinder group when an air fuel ratio output by the exhaust gas sensor is greater than a threshold air fuel ratio, and wherein instructions to reactivate the individual cylinders sequentially based on the temperature of the exhaust catalyst include reactivating the individual cylinders when the temperature is less than a threshold temperature and a rate of change of the temperature is steady.

18. The system of claim 17, the control system further comprising instructions to deactivate an individual cylinder of the first or second cylinder group responsive to an indication of individual cylinder misfire and to not reactivate the individual cylinder until a diagnostic code indicating misfire in the individual cylinder is cleared.

* * * * *